United States Patent [19]

Gano

[11] Patent Number: 4,856,747

[45] Date of Patent: Aug. 15, 1989

[54] RATCHET JACK STAND

[75] Inventor: David A. Gano, Salem, Ohio

[73] Assignee: Ganeaux Industries, Inc., Salem, Ohio

[21] Appl. No.: 251,336

[22] Filed: Sep. 30, 1988

[51] Int. Cl.$^4$ .......................................... F16M 13/00
[52] U.S. Cl. .................................. 248/354.7; 248/352
[58] Field of Search ................... 248/352, 354.7, 354.5, 248/354.6

[56] References Cited

U.S. PATENT DOCUMENTS

| | | |
|---|---|---|
| 1,416,896 | 5/1922 | Simmons . |
| 1,499,280 | 6/1924 | Alheit . |
| 1,894,293 | 1/1933 | Green .................................. 248/352 |
| 2,439,854 | 4/1948 | Lipski ................................. 248/352 |
| 2,514,095 | 7/1950 | Schreiber ........................... 248/352 |
| 3,178,146 | 4/1965 | Goodale ............................. 248/352 |
| 3,355,136 | 11/1967 | Staples ............................... 248/352 |
| 3,493,209 | 2/1970 | Brammer ........................... 248/352 |
| 3,599,923 | 8/1971 | Humnicutt ......................... 248/352 |
| 3,802,658 | 4/1974 | Binding .............................. 248/352 |
| 3,970,278 | 7/1976 | Studer ................................ 248/352 |
| 4,009,855 | 3/1977 | Hoffmann et al. ................. 248/352 |
| 4,021,012 | 5/1977 | Miller ................................. 248/352 |
| 4,042,202 | 8/1977 | Molinari ............................. 248/352 |
| 4,141,526 | 2/1979 | John ................................... 248/352 |

FOREIGN PATENT DOCUMENTS

| | | | |
|---|---|---|---|
| 777416 | 2/1935 | France ............................ 248/354.6 |
| 305041 | 4/1937 | Italy ................................ 248/354.6 |
| 724420 | 2/1955 | United Kingdom ............ 248/354.6 |
| 743581 | 1/1956 | United Kingdom ............ 248/354.6 |

Primary Examiner—Alvin C. Chin-Shue
Attorney, Agent, or Firm—Michael Sand Co.

[57] ABSTRACT

A ratchet jack stand assembly intended for supporting a raised load is formed entirely of stamped steel components and is free of any spring-biased members. The assembly includes a base, a housing welded to the base, an elongated post slideably supported by the housing in an upright position, and a gravity-biased handle pivotally mounted on the housing. A plurality of inclined, longitudinally spaced notches are formed in the post and a saddle is welded to its upper end. A pair of inclined, horizontally spaced and aligned slots are formed in the housing. The gravity-biased handle has spaced upper and lower pins attached thereto, and is pivotally mounted on the housing by the lower pin. The upper pin of the handle is positioned and adapted to slideably move along the aligned housing slots to a locked position as the handle moves to its biased position when a selected one of the post notches is manually aligned with the housing slots, for positive locking engagement with the post notch to adjustably support the post at a predetermined height for supporting a raised load.

8 Claims, 2 Drawing Sheets

RATCHET JACK STAND

TECHNICAL FIELD

The invention relates to jack stands of the type intended for supporting a raised load and in particular to an improved ratchet jack stand. More particularly, the invention relates to such an improved jack stand which is adjustably supported at a predetermined height by a gravity-biased, positively locking ratchet mechanism.

BACKGROUND ART

Jack stands have been utilized for many years to support various types of raised loads. For example, often it is necessary for the home handyman to utilize a usual jack or other suitable lifting equipment such as ramps, for raising an automobile to be repaired to gain access to the parts in need of repair. However, such lifting equipment often is unsuitable for safely supporting the load in the raised position. Thus, one or more jack stands are positioned usually under the frame or axles of the raised vehicle, and the extensible post of each stand is raised to the appropriate height and locked at such height to support the vehicle in the raised position. It can be seen that in such applications the adjustability and positive locking of the stand at the desired height are very important features. Moreover, the strength and stability of the jack stand also are very critical features for obvious safety reasons.

In recent years, jack stands have become popular items in auto part stores, discount stores and the like, and are purchased for supporting automobiles, boat trailers, camping trailers, etc. Since cost is a primary consideration to most consumers, the jack stand must be low-cost and effective in use, as well as durable and safe.

The known prior art includes numerous jack stands which utilize various types of locking means to adjustably support the jack stand post at a selected height. U.S. Pat. Nos. 1,499,280; 2,439,854; 3,355,136; 4,009,855; and 4.042,202 all disclose jack stands having separate locking pins adapted to be manually slideably engaged with longitudinally spaced openings formed in the jack stand post and with the base of the stand in some manner for supporting the post at a desired height. U.S. Pat. No. 1,416,896 discloses the same general concept as the above-listed patents, except that the locking pins thereof are part of the jack stand assembly and are spring-biased. U.S. Pat. Nos. 3,493,209 and 4,141,526 disclose jack stands having threaded adjustable posts. U.S. Pat. Nos. 2,514,095 and 4,021,012 disclose jack stands having a pivoting hook and a tooth and recess locking mechanism, respectively. U.S. Pat. No. 3,970,278 merely discloses a particular base construction for a jack stand.

The closest known prior art to my ratchet jack stand of the present invention is disclosed in U.S. Pat. Nos. 3,599,923 and 3,802,658. However, there are important differences between the respective ratchet jack stands disclosed in these patents and my improved ratchet jack stand. The jack stand of U.S. Pat. No. 3,599.923 has a pawl or hook-like member which is adapted for positive locking engagement with an adjustable post. The pawl is releasable from the post by a lever when downward adjustment of the post is desired. In contrast, the present invention utilized a pin attached to a gravity-biased handle for positive locking engagement with an adjustable post. Although the handle is used to release the pin from engagement with the post when downward adjustment of the post is required, the gravity biased handle also is important since the weight of the handle biases the pin toward the locked or post-engaged position at all times.

Although the jack stand of U.S. Pat. No. 3,802,658 uses a pin to lockingly engage a notched post, the pin is not biased in the direction of positive locking engagement by a pivotally mounted gravity-biased handle as is the locking pin of my invention, but rather is spring-biased.

Therefore, the need exists for an improved ratchet jack stand having a gravity-biased positive locking ratchet mechanism for adjustably supporting the jack stand post at a predetermined height to support a raised load.

DISCLOSURE OF THE INVENTION

Objectives of the invention include providing an improved ratchet jack stand which is adjustably positively locked at a selected height by a gravity-biased mechanism for supporting a raised load.

Another objective of the invention is to provide such an improved ratchet jack stand which is formed entirely of heavy gauge stamped steel components and which is free of expensive metal castings and machined parts which can have hidden defects discoverable only by x-ray testing, and which is free of springs which are expensive and susceptible to wear and possible failure.

Still another objective of the invention is to provide such an improved ratchet jack stand which has a large weight capacity and a wide, multi-position adjustment range.

A still further objective of the invention is to provide such an improved ratchet jack stand which is strong, stable, durable, safe, inexpensive to manufacture, and easy to use and maintain.

These objectives and advantages are obtained by the ratchet jack stand assembly of the invention of the type intended for supporting a raised load, the general nature of which may be stated as including, a base, an elongated post having a plurality of inclined, longitudinally spaced notches formed therein and a saddle attached to an upper end thereof, a housing attached to the base for slideably supporting the post in an upright position, the housing having a pair of inclined, horizontally spaced and aligned slots formed therein, and a gravity-biased handle having spaced upper and lower pins attached thereto, the handle being pivotally mounted on the housing by a certain one of the upper and lower pins, with the other of the pins being positioned and adapted to slideably move along the aligned housing slots to a locked position as the handle moves to its biased position when a selected one of the post notches is manually aligned with the housing slots for positive locking engagement with the post notch to adjustably support the post at a predetermined height for supporting a raised load.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

BEST MODE FOR CARRYING OUT THE INVENTION

Figure 1:
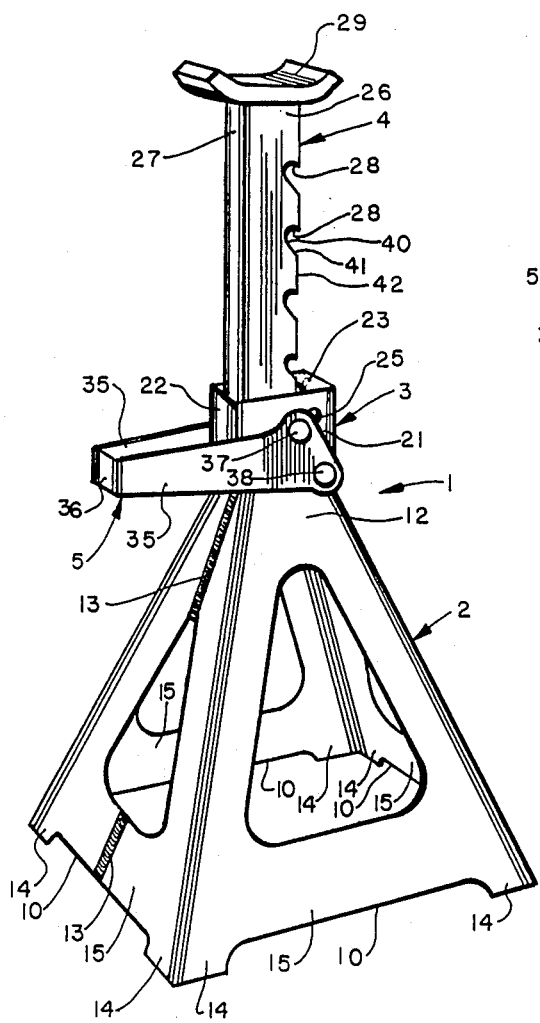
FIG. 1 is a perspective view of the improved ratchet jack stand of the present invention.

The improved ratchet jack stand of the present invention is indicated generally at 1, and is shown particularly in FIG. 1. Ratchet jack stand 1 is intended for supporting a raised load subsequent to the lifting of the load by a usual jack or other lifting mechanism. Jack stand 1 includes a base 2, a housing 3 attached to the upper end of the base, an elongated post 4 slideably supported by the housing in an upright position, and a gravity-biased handle 5 pivotally mounted on the housing.

Base 2 is a generally pyramidal-shaped member formed by four similar, generally A-shaped inclined sidewalls 10 (FIG. 1). An opening 11 (FIG. 3) is formed in an apex 12 of base 2, the purpose of which will be described in greater detail below. A plurality of feet 14 are formed integrally with and along a bottom skirt 15 of base 2 to provide a stable, four-point contact with the surface on which the base is placed. Base 2 preferably is manufactured as a pair of similar, heavy gauge stamped steel members attached by welds 13 to form the base.

Figure 4:
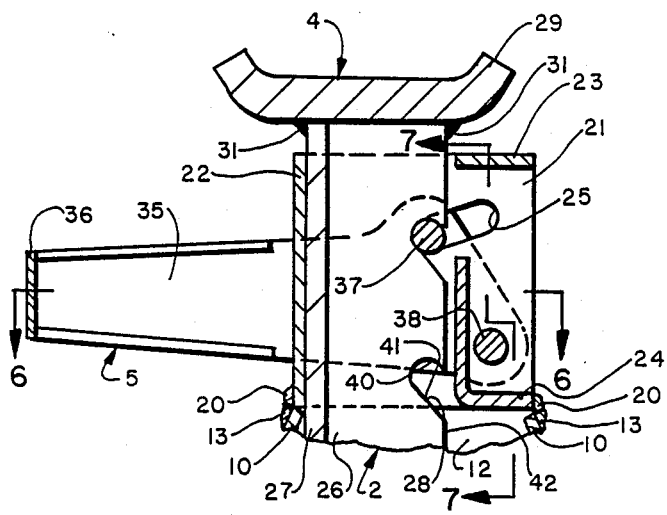
FIG. 4 is an enlarged fragmentary sectional view of the locking ratchet mechanism of the jack stand of the invention, as shown in FIG. 2 in engaged position.
Figure 7:
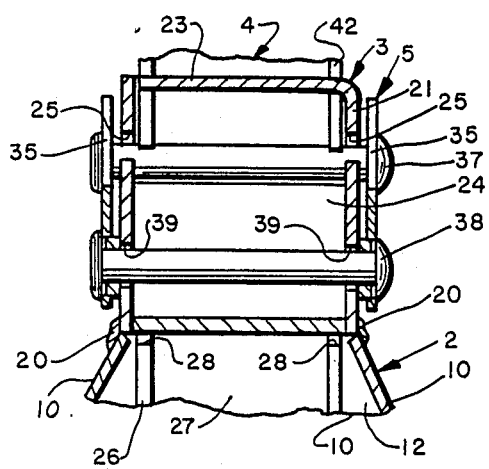
FIG. 7 is a fragmentary sectional view taken on line 7—7, FIG. 4.

Housing 3 is a generally rectangular box-shaped member attached by welds 20 to apex 12 of base 2 directly above base opening 11 for slideably supporting post 4 in an upright position. Housing 3 also is formed of a heavy gauge stamped steel. Housing 3 includes a pair of spaced sidewalls 21, a web wall 22, and an upper transverse ledge 23 and a spaced generally L-shaped lower guide member 24 which generally extend between the housing sidewalls (FIGS. 4 and 7). Housing sidewalls 21, web wall 22 and transverse ledge 23 form an integral one-piece member, and guide member 24 is attached to sidewalls 21 by any suitable means such as welds. A pair of inclined, horizontally spaced and aligned slots 25 are formed in housing sidewalls 21 (FIG. 7).

Figure 2:
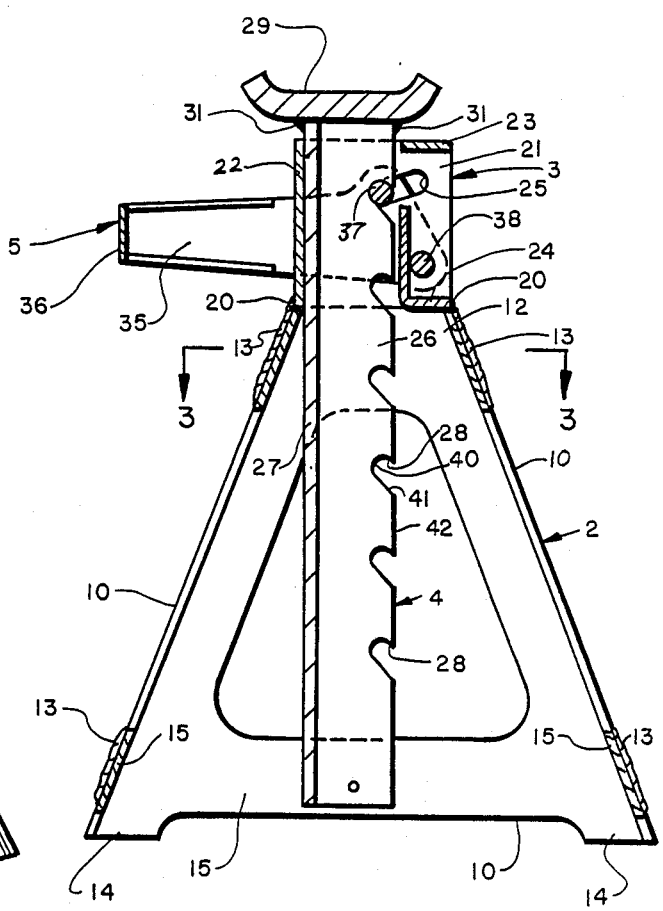
FIG. 2 is an enlarged longitudinal sectional view of the improved jack stand of FIG. 1 with the post adjusted to its lowest position, and showing the upper pin of the handle positively engaged with one of the post notches.
Figure 3:
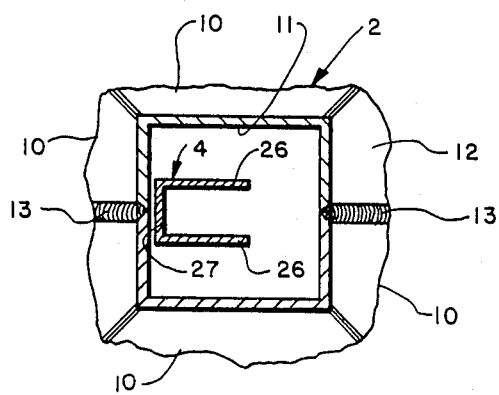
FIG. 3 is a sectional view taken on line 3—3, FIG. 2.
Figure 6:
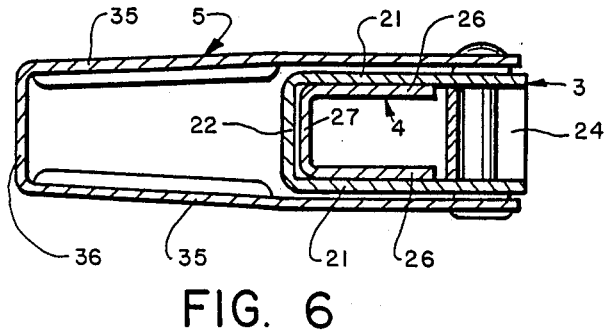
FIG. 6 is a sectional view taken on line 6—6, FIG. 4.

Elongated post 4 is an integral one-piece member formed of heavy gauge stamped steel (FIGS. 1 and 2). Post 4 is generally U-shaped in cross section and includes a pair of spaced sidewalls 26 and a web wall 27 (FIGS. 3 and 6). A plurality of inclined, longitudinally spaced notches 28 are formed in each sidewall 26, with each of the notches being aligned with a respective one of the notches of the other sidewall. A saddle 29 is attached to the upper end of post 4 by welds 31.

Figure 5:
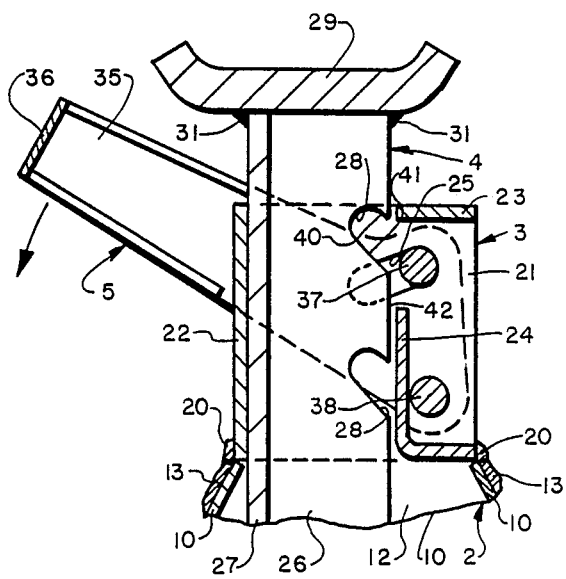
FIG. 5 is a sectional view similar to FIG. 4, showing the upper pin of the handle disengaged from the post notch.

In accordance with one of the main features of the invention, gravity-biased handle 5 is a generally U-shaped, elongated integral one-piece member formed of stamped steel (FIG. 1). Handle 5 includes a pair of sidewalls 35 and a web wall 36. Spaced upper and lower ins 37 and 38, respectively, extend between and are attached to handle sidewalls 35 in a manner well-known in the art (FIGS. 6 and 7). Pines 37 and 38 preferably are formed of case-hardened steel. Lower pin 38 passes through a pair of generally complementary-sized and shaped openings 39 formed in housing sidewalls 21 to pivotally mount handle 5 on the housing, and upper pin 37 posses through housing slots 25. Upper pin 37 thus is positioned and adapted to slideably move along aligned housing slots 25 to a locked position, as handle 5 moves to its downwardly biased position when a selected aligned pair of post notches 28 is manually aligned with the slots. Upper pin 37 is generally vertically aligned with lower pin 38 when handle 5 is moved against its bias to an unlocked position (FIG. 5). Upper pin 37 is out of vertical alignment with lower pin 38 and is positioned closer to post 4 than the lower pin when handle 5 moves to its biased position. Pin 37 provides a positive locking engagement with the selected post notch to adjustably support the post at a predetermined height, as described in greater detail below.

The operation and important features of the improved ratchet jack stand are set forth below. An object to be supported is raised to a desired height by a usual jack or other lifting means (not shown). Jack stand 1 then is placed beneath the existing load with post 4 preferably in its lowermost position as shown in FIG. 2. Post 4 then is adjusted to the appropriate height by manually sliding the post upwardly. Notched post 4 and gravity-biased handle 5 with its upper and lower pins 37 and 38 cooperate to function as a ratchet mechanism to automatically lock the post at the desired height. More specifically, each notch 28 comprises a concavely-curved portion 40 and a camming surface 41. As post 4 is manually slid upwardly from the position illustrated in FIG. 2, pin 37 engages camming surface 41 of the engaged notch to cam the pin out of the notch and upwardly along housing slots 25. Lands 42 of post sidewalls 26, which are formed between the notches, provide for holding pin 37 at the upper end of the housing slots while the post is being moved from one aligned pair of notches to the pair of notches next below.

When the desired height is reached, for example as shown in FIG. 1, the appropriate pair of notches is aligned with the housing slots enabling the upper pin to slide downwardly into the notches as the handle 5 moves to its biased or downward position. Curved portions 40 of the notches snugly receive upper pin 37 for positive locking engagement of the post at the desired height (FIGS. 4 and 7), at which height saddle 29 engages the raised object. The lifting means then can be removed from the raised object which is supported by the jack stand. It is understood that more than one jack stand may be required to safely support a given raised object.

When it is desired to lower the post, the load must be lifted from saddle 29 and the post must be manually raised slightly to remove the weight of the post from upper pin 37. The upper pin then can be disengaged from the notches by manual upward movement of handle 5 against its bias, as shown in FIG. 5, so that the upper pin moves upwardly along the housing slots and out of the notches. The post then can be manually moved downwardly until the desired height is reached, and the upper pin allowed to engage the appropriate notches for the desired post height by releasing the handle. Post 4 can be moved from its upwardmost to its downwardmost position due to opening 11 formed in apex 12 of base 2, which is adapted to allow passage of the post therethrough as illustrated in FIG. 3.

Therefore, the important feature of the present invention is the gravity-biased handle having upper and lower pins attached thereto, wherein the handle is pivotally mounted on the jack stand housing by the lower pin, and further wherein the upper pin of the handle is positioned and adapted to slideably move along the aligned housing slots to a locked position as the handle moves to its biased position when a selected aligned pair of the post notches is manually aligned with the slots, for positive locking engagement with the notches to adjustably support the post at a desired height for supporting a raised load.

Another important feature of the present invention is its construction of heavy gauge stamped steel components which are variously welded together and assembled to form the improved ratchet jack stand. Moreover, the jack stand is free of expensive spring-biased latch mechanisms, unlike many prior art jack stands, which are subject to wear and failure. Also, the jack stand saddle is immovably welded to the post.

In summary, the improved jack stand can be adjustably positively locked at a selected height by a gravity-biased mechanism for supporting a raised load. The jack stand has a weight capacity of 2¼ tons and a six position adjustment range of 6¼ inches. The stand is free of many prior art cast iron components which can have hidden defects and which require extensive machining. The improved ratchet jack stand is strong, stable, durable, safe, inexpensive to manufacture, and easy to use and maintain.

Accordingly, the improved ratchet jack stand is simplified, provides an effective, safe, inexpensive, and efficient assembly which achieves all the enumerated objectives, provides for eliminating difficulties encountered with prior devices, and solves problems and obtains new results in the art.

In the foregoing description, certain terms have been used for brevity, clearness and understanding, but no unnecessary limitations are to be implied therefrom beyond the requirements of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved ratchet jack stand is assembled and used, the characteristics of the assembly, and the advantageous, new and useful results obtained; and new and useful structures, devices, elements, arrangements, parts, and combinations, are set forth in the appended claims.

What is claimed is:

1. A ratchet jack stand assembly of the type intended for supporting a raised load including:
   (a) a base;
   (b) an elongated post having a plurality of inclined, longitudinally spaced notches formed therein and a saddle attached to an upper end thereof;
   (c) a housing attached to the base for slideably supporting the post in an upright position, said housing including a pair of spaced sidewalls having a pair of inclined, horizontally spaced and aligned slots formed therein; and
   (d) a gravity-biased handle including a pair of spaced sidewalls having spaced upper and lower pins attached thereto, said handle being pivotally mounted on the housing sidewalls by a certain one of the upper and lower pins, said certain one of the pins extending between the handle sidewalls and passing through a pair of generally complementary-sized and shaped openings formed in the housing sidewalls for pivotally mounting the handle on the housing, and the other of said pins extending between the handle sidewalls and passing through the housing slots, and being positioned and adapted to slideably move along the aligned housing slots to a locked position as the handle moves to its biased position when a selected one of the post notches is manually aligned with said housing slots, so that said other pin is generally vertically aligned with said certain pin when the handle is moved against its bias to an unlocked position, and said other pin is out of vertical alignment with said certain pin and is positioned closer to the post than said certain pin when the handle moves to its biased position, for positive locking engagement with said post notch to adjustably support the post at a predetermined height for supporting a raised load.

2. The assembly defined in claim 1 in which the post is generally U-shaped integral one-piece member comprising a pair of spaced sidewalls and a web wall; in which a plurality of the inclined, longitudinally spaced notches are formed in each of the sidewalls; and in which each of the notches is aligned with a respective one of the notches of the other sidewall.

3. The assembly defined in claim 1 in which the base is a generally pyramidal-shaped member; and in which an opening is formed in an apex of the base to allow passage of the post therethrough.

4. The assembly defined in claim 3 in which the base is formed by a plurality of similar, generally A-shaped inclined sidewalls.

5. The assembly defined in claim 3 in which the housing is a generally rectangular box-shaped member attached to the apex of the base; and in which the housing comprises the pair of spaced sidewalls, a web wall and means extending generally between said sidewalls opposite from said web wall for retaining and guiding the post within the housing.

6. The assembly defined in claim 5 in which the means extending generally between the housing sidewalls is an upper transverse ledge and a spaced, generally L-shaped lower guide member.

7. The assembly defined in claim 5 in which the handle is an elongated, generally U-shaped integral one-piece member having a pair of sidewalls and the web wall; in which the lower pin extends between the handle sidewalls and passes through the pair of generally complementary-sized and shaped openings formed in the housing sidewalls to pivotally mount the handle on the housing; in which the upper pin extends between the handle sidewalls and passes through the housing slots; and in which the upper pin is generally vertically aligned with the lower pin when the handle is moved against its bias to an unlocked position, and said upper pin is out of vertical alignment with said lower pin and is positioned closer to the post than the lower pin when the handle moves to its biased position.

8. The assembly defined in claim 1 in which the ratchet jack stand is formed of heavy gauge stamped steel components and is free of metal castings, machined parts and spring-biased members.

* * * * *